(12) United States Patent
Abe et al.

(10) Patent No.: US 8,485,290 B2
(45) Date of Patent: Jul. 16, 2013

(54) POWER PLANT

(75) Inventors: Noriyuki Abe, Saitama-ken (JP);
Shigemitsu Akutsu, Saitama-ken (JP);
Yoshio Okada, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 857 days.

(21) Appl. No.: 12/078,032

(22) Filed: Mar. 26, 2008

(65) Prior Publication Data

US 2008/0236917 A1    Oct. 2, 2008

(30) Foreign Application Priority Data

Mar. 30, 2007   (JP) .................................. 2007-090776

(51) Int. Cl.
*B60K 6/00*            (2007.10)
(52) U.S. Cl.
USPC ........................... 180/65.21; 180/65.25; 475/5
(58) Field of Classification Search
USPC ................. 180/65.21, 65.22, 65.225, 65.235, 180/65.25, 65.26, 65.6, 65.7
See application file for complete search history.

(56) References Cited

U.S. PATENT DOCUMENTS

| | | | |
|---|---|---|---|
| 5,934,395 A * | 8/1999 | Koide et al. | 180/65.235 |
| 6,344,008 B1 * | 2/2002 | Nagano et al. | 475/1 |
| 2004/0124021 A1 * | 7/2004 | Shirai et al. | 180/65.2 |

FOREIGN PATENT DOCUMENTS

| | | |
|---|---|---|
| JP | 2004-175320 | 6/2004 |
| JP | 2005-061498 | 3/2005 |

* cited by examiner

*Primary Examiner* — Katy M Ebner
(74) *Attorney, Agent, or Firm* — Squire Sanders (US) LLP

(57) ABSTRACT

A power plant which is capable of improving the drive efficiency and the power generation efficiency thereof when the electric power is generated using the power of a driven part thereof. A power plant has an internal combustion engine having a crankshaft, and a rotary motor having a rotor. A planetary gear train includes a sun gear, a ring gear, and a carrier rotatably supporting a planetary gear in mesh with the sun gear and the ring gear. The sun gear and the ring gear are connected to drive wheels. The carrier is connected to the crankshaft. The rotor is connected between one of the sun gear and the ring gear and the drive wheels. A transmission is connected between the other of the gears and the drive wheels, for varying a speed of power of the engine and transmitting the power to the drive wheels.

2 Claims, 11 Drawing Sheets

POWER PLANT

BACKGROUND OF THE INVENTION

1. Field of the Invention

The present invention relates to a power plant for driving a driven part, and more particularly to a power plant including a prime mover and a rotary motor as power sources.

2. Description of the Related Art

Conventionally, as the power plant of this kind, one disclosed in Japanese Laid-Open Patent Publication (Kokai) No. 2004-175320 is known. This power plant is for driving drive wheels of a vehicle, and is equipped with an internal combustion engine and a motor generator as power sources, and a stepless transmission and a planetary gear train for transmitting power to the drive wheels. The planetary gear train is a general type that has a sun gear, a ring gear, and a carrier, and the sun gear and the ring gear are connected to the drive wheels via a high clutch and a low clutch, respectively. The engine is connected to the carrier via a main shaft, and the main shaft is connected to an input pulley of the stepless transmission. Further, the motor generator, the output pulley of the stepless transmission, and the sun gear are connected to each other via an auxiliary shaft.

The power plant configured as above has operation modes one of which is a torque circulation mode mainly used during low-speed traveling. In the torque circulation mode, the aforementioned high clutch is disengaged to thereby disconnect between the sun gear and the drive wheels, and the low clutch is engaged to connect between the ring gear and the drive wheels. Thus, the torque of the motor generator is transmitted to the carrier via the auxiliary shaft, the stepless transmission, and the main shaft. Further, the torque transmitted to the carrier is distributed between the ring gear and the sun gear, and torque distributed to the ring gear is transmitted to the drive wheels. On the other hand, torque distributed to the sun gear is transmitted to the auxiliary shaft, and after being combined with the torque of the motor generator, it is transmitted to the carrier via the stepless transmission and the main shaft. As described above, in the torque circulation mode, the power of the motor generator is transmitted to the drive wheels while circulating through the stepless transmission and the planetary gear train.

As described above, in the conventional power plant, since during operation in the torque circulation mode, the transmission of power from the motor generator to the drive wheels is carried out necessarily via the stepless transmission, and hence due to power transmission loss at the stepless transmission, the drive efficiency of the power plant is reduced. Further, for example, during the operation in the torque circulation mode, also when electric power is generated by the motor generator using the power of the drive wheels, the transmission of power from the drive wheels to the motor generator is performed via the stepless transmission, and hence it is also impossible to obtain a sufficient power generation efficiency due to power transmission loss at the stepless transmission.

SUMMARY OF THE INVENTION

It is an object of the present invention to provide a power plant which is capable of improving the drive efficiency and the power generation efficiency thereof when electric power is generated using the power of a driven part thereof.

To attain the above object, the present invention provides a power plant for driving a driven part, comprising a prime mover having an output shaft, a planetary gear train including a sun gear, a ring gear, and a carrier rotatably supporting a planetary gear in mesh with the sun gear and the ring gear, the sun gear and the ring gear being connected to the driven part, the carrier being connected to the output shaft of the prime mover, a rotary motor having an output connected to one of the sun gear and the ring gear, and a transmission connected between the other of the sun gear and the ring gear, and the driven part, for varying a speed of power of the prime mover and transmitting the power to the driven part.

With the arrangement of the power plant according to the present invention, the carrier of the planetary gear train is connected to the output shaft of the prime mover, and the sun gear and the ring gear are connected to the driven part. The output of the rotary motor is connected to one of the sun gear and the ring gear (hereinafter referred to as "the one gear"), and the transmission is connected between the other of the sun gear and the ring gear (hereinafter referred to as "the other gear") and the driven part. Thus, the rotary motor and the driven part are connected to each other not via the transmission, and hence the transmission of power between the rotary motor and the driven part can be executed without causing power transmission loss. Therefore, compared with the conventional cases where the power transmission is necessarily executed via the transmission, it is possible to increase the efficiency of driving the driven part by the rotary motor and the efficiency of electric power generation by the rotary motor using the power of the driven part.

Further, the prime mover and the driven part are connected to each other via the carrier and the one gear (hereinafter, a path formed by these component elements will be referred to as "the first power transmission path"), and via the carrier, the other gear, and the transmission (hereinafter, a path formed by these component elements will be referred to as "the second power transmission path"). Thus, as the path connecting between the prime mover and the driven part, the power plant has not only the second power transmission path including the transmission, but also the first power transmission path not including the transmission. Therefore, compared with the conventional cases where the power transmission between the prime mover and the driven part is necessarily executed via the transmission, it is possible to suppress power transmission loss at the transmission, and hence it is also possible to increase the efficiency of driving the driven part by the prime mover. Further, for the same reason, it is possible to reduce the torque transmitted to the transmission, and hence by employing a transmission adapted to the reduced transmission torque, it is possible to attain the high efficiency and reduced size of the transmission, which in turn makes it possible to attain further improvement of the drive efficiency of the power plant in its entirety, and the reduction of the size thereof.

Preferably, the driven part comprises drive wheels formed by one of a front set of wheels or a rear set of wheels, and the one and the other of the sun gear and the ring gear are both connected to the drive wheels.

Assuming, for example, that the one gear and the other gear are connected to the front drive wheels and the rear drive wheels, respectively, if output of power from the rotary motor or electric power generation by the rotary motor is executed during driving of the vehicle by the power of the prime mover, reaction forces from a road surface act on the front and rear drive wheels in a manner causing torque to be balanced between the front wheels and the rear wheels, which inevitably causes a relatively large torque loss. As a result, the drive efficiency of the drive wheels is largely reduced. Further, if it is attempted to suppress such a torque loss to the minimum, it is required to perform a very fine-grained control of the torque of the prime mover and that of the rotary motor, and hence the control becomes very complicated.

According to this preferred embodiment, the one gear and the other gear are both connected to the drive wheels formed by one of a front set of wheels and a rear set of wheels, and hence, whichever of the output of power from the rotary motor or the electric power generation by the rotary motor may be executed during driving of the vehicle by the power of the prime mover, differently from the above-mentioned cases, the reaction forces from the road surface do not act on the front and rear drive wheels in a manner causing torque to be balanced between the front wheels and the rear wheels. Therefore, it is possible to further increase the drive efficiency of the drive wheels and easily control the torque of the drive wheels to a desired magnitude.

The above and other objects, features, and advantages of the present invention will become more apparent from the following detailed description taken in conjunction with the accompanying drawings.

DETAILED DESCRIPTION OF PREFERRED EMBODIMENTS

Figure 1:
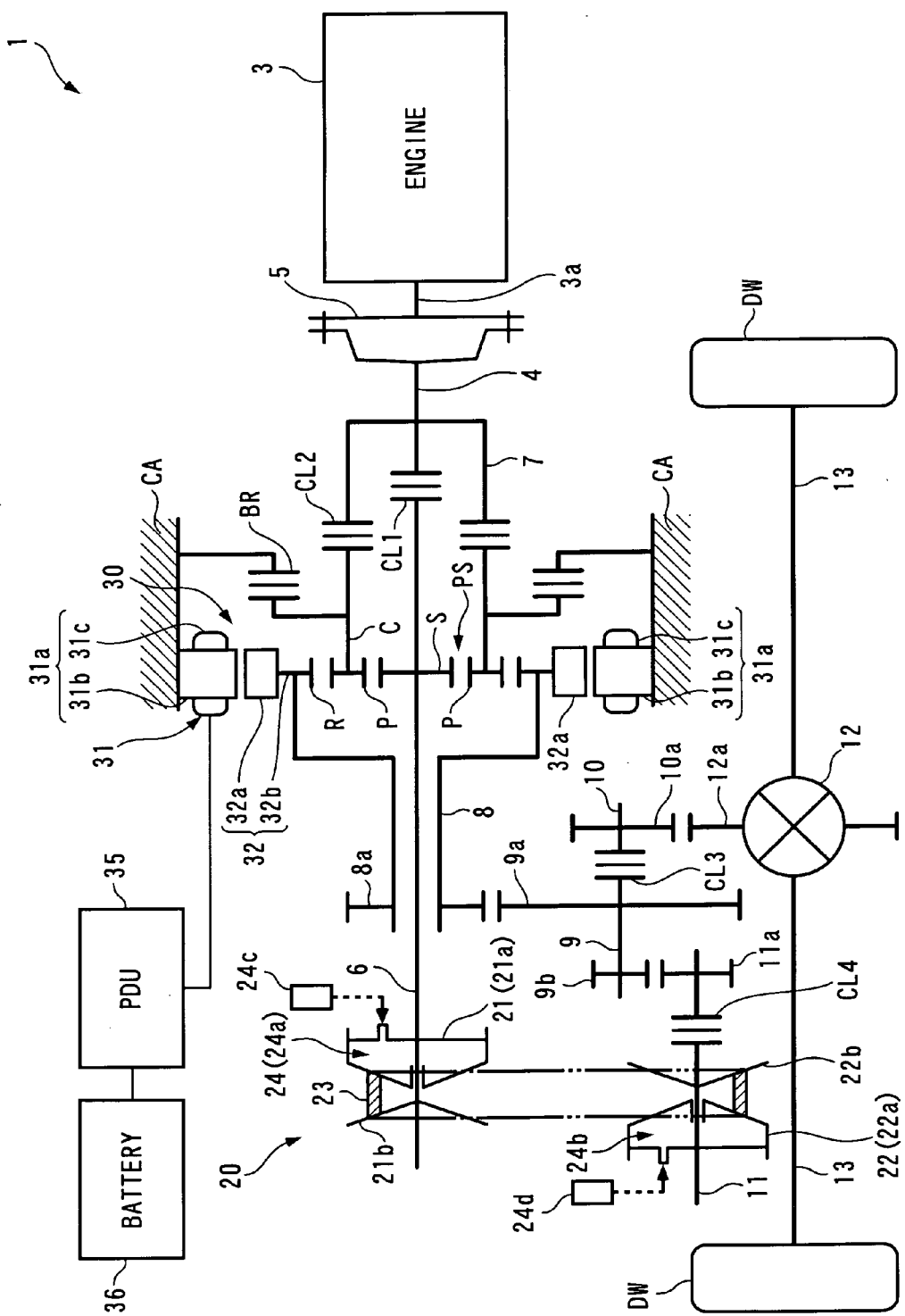
FIG. 1 is a schematic diagram of a power plant according to the present embodiment.
Figure 2:
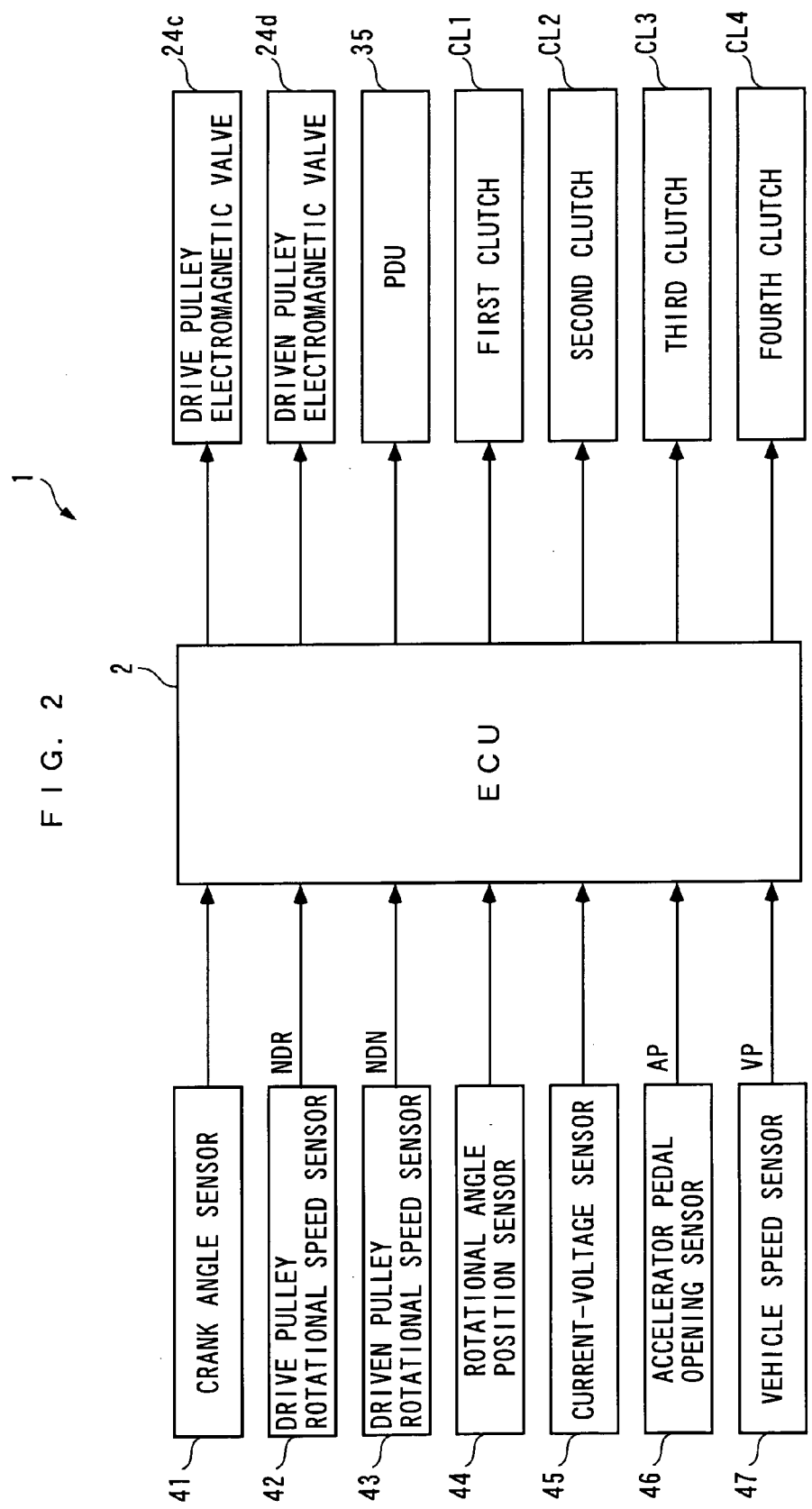
FIG. 2 is a block diagram of part of the power plant according to the present embodiment.

The present invention will now be described in detail with reference to the drawings showing a preferred embodiment thereof. It should be noted that in the figures, hatching in portions illustrating cross-sections are omitted for convenience. FIG. 1 schematically shows a power plant 1 according to the present embodiment. The power plant 1 is for driving front wheels of the vehicle, i.e. left and right drive wheels DW and DW (driven part) on the front side of a front-driven four-wheel vehicle, not shown, and includes an internal combustion engine 3 (prime mover) and a rotary motor 30 as power sources, and a planetary gear train PS, a stepless transmission 20 (transmission) a differential gear mechanism 12, and right and left drive shafts 13 and 13, for transmitting the driving force to the drive wheels DW and DW. The differential gear mechanism 12 is connected to the drive wheels DW and DW via the drive shafts 13 and 13. Further, as shown in FIG. 2, the power plant 1 is provided with an ECU 2 for controlling the engine 3, the rotary motor 30, the stepless transmission 20.

The internal combustion engine (hereinafter referred to as "the engine") 3 is e.g. a gasoline engine, and has a crankshaft 3a (output shaft) to which is concentrically connected a first connecting shaft 4 via a flywheel 5. The first connecting shaft 4 is rotatably supported by a bearing, not shown.

The planetary gear train SP is a general type and is comprised of a sun gear S, a ring gear R which is rotatably disposed around the outer periphery of the sun gear and has a larger number of teeth than the sun gear S, a plurality of (e.g. three) planetary gears P (two of which are shown) in mesh with the two gears S and R, and a carrier C rotatably supporting the planetary gears P.

The sun gear S is integrally formed on a main shaft 6. The main shaft 6 is rotatably supported on a pair of bearings, not shown, and is concentrically connected to the first connecting shaft 4 via a first clutch CL1. The first clutch CL1 is of a friction multi-disc clutch, and the degree of engagement thereof is controlled by the ECU 2, whereby the connection between the first connecting shaft 4 and the main shaft 6 is established and cut off. With this arrangement, when the first clutch CL1 is engaged, the sun gear S is connected to the crankshaft 3a of the engine 3 via the first connecting shaft 4 and a flywheel 5.

The carrier C is concentrically connected on a second connecting shaft 7 via the second clutch CL2. The second connecting shaft 7 is formed to be hollow, and is concentrically connected to the first connecting shaft 4 disposed inside the second connecting shaft 7. The second clutch CL2 is of a friction multi-disc clutch similar to the first clutch CL1, and the degree of engagement thereof is controlled by the ECU 2, whereby the connection between the carrier C and the second connecting shaft 7 is established and cut off. With this arrangement, when the second clutch CL2 is engaged, the carrier C is connected to the crankshaft 3a via the second connecting shaft 7, the first connecting shaft 4, and the flywheel 5. Further, the carrier C is provided with an electromagnetic brake BR. The electromagnetic brake BR is turned on or off by the ECU 2, and unrotatably holds the carrier C when it is on, but permits the rotation thereof when it is off.

The ring gear R is connected to a rotary shaft 8 which is formed to be hollow. The rotary shaft 8 is rotatably supported on a pair of bearings, not shown. The main shaft 6 is rotatably fitted in the rotary shaft 8. Further, the rotary shaft 8 has a gear 8a integrally formed thereon which is in mesh with a first idler gear 9a integrally fixed to the first idler shaft 9.

The first idler shaft 9 is rotatably supported on a pair of bearings, not shown, and is concentrically connected to a second idler shaft 10 via a third clutch CL3. The second idler shaft 10 has a gear 10a integrally formed thereon which is in mesh with a gear 12a of the aforementioned differential gear mechanism 12. The third clutch CL3 is of a friction multi-disc clutch similar to the first clutch CL1, and the degree of engagement thereof is controlled by the ECU 2, whereby the connection between the first idler gear 9 and the second idler gear 10 is established and cut off.

With this arrangement, when the third clutch CL3 is engaged, the ring gear R is connected to the drive wheels DW and DW via the rotary shaft 8, the gear 8a, the first idler gear 9a, the first idler shaft 9, the second idler shaft 10, the gear 10a, the gear 12a, the differential gear mechanism 12, and the drive shafts 13 and 13. Hereinafter, a sequence of these component elements from the rotary shaft 8 to the drive shafts 13 and 13 will be referred to as "the first power transmission path") as deemed appropriate.

The aforementioned rotary motor 30 is a three-phase brushless DC motor, and is provided integrally with the planetary gear train PS. The rotary motor 30 has a stator 31 formed by 3n armatures 31a, a rotor 32 (output) disposed in a manner opposed to the stator 31. Each armature 31a is formed by a iron core 31b, and a coil 31c wound around the iron core 31b. The armatures 31a are fixed to a case CA and are arranged at substantially equal intervals in the circumferential direction of the ring gear R. The 3n coils 31c form n sets of three-phase coils of U-phase coils, V-phase coils, and W-phase coils. Further, a battery 36 and the ECU 2 are connected to the armatures 31a via a PDU 35 (see FIG. 2), and the PDU 35 is comprised of electric circuits, including an inverter.

The rotor 32 has n permanent magnets 32a (only two of which are shown) arranged side by side in the circumferential direction of the ring gear R at substantially equal intervals, with each adjacent two of the magnets 32a are different in polarity. Each permanent magnet 32a is mounted on the outer peripheral surface of the ring gear R via an annular fixing portion 32b formed e.g. of a soft magnetic material (e.g. iron). With this arrangement, the rotor 32 is rotatable in unison with the ring gear R.

In the rotary motor 30 constructed as described above, when electric power is supplied to the armatures 31a from the battery 36, the rotor 32 rotates, and at the same time, the ECU 2 controls the magnitude and frequency of electric current supplied to the armatures 31a, whereby the torque and rotational speed of the rotor 32, i.e. the torque and rotational speed of the rotary motor 30 are controlled. Further, when the rotor 32 is rotated by an external force with power supply to the armatures 31a cut off, the ECU 2 controls the PDU 35 whereby an induced electromotive force is generated in the armatures 31a to generate electric power.

The aforementioned stepless transmission 20 is a so-called belt type, and is comprised of a drive pulley 21, a driven pulley 22, a transmission belt 23, and a variable pulley width mechanism 24.

The drive pulley 21 has a movable sheave 21a and a fixed sheave 21b which are opposed to each other. The movable sheave 21a is mounted on the aforementioned main shaft 6 in a manner axially movable but unrotatable relative to the main shaft 6. The fixed sheave 21b is fixed to the main shaft 6. Further, a V shaped belt groove is formed between the movable sheave 21a and the fixed sheave, for having a transmission belt fitted therein such that the transmission belt extends around the drive pulley 22.

The driven pulley 22 is configured similarly to the drive pulley 21. More specifically, the driven pulley 22 has a movable sheave 22a and a fixed sheave 22b which are opposed to each other. The movable sheave 22a is mounted on an auxiliary shaft 11, referred to hereinafter, in a manner axially movable but unrotatable relative to the auxiliary shaft 11. The fixed sheave 22b is fixed to the auxiliary shaft 11. Further, a V-shaped belt groove is formed between the movable sheave 22a and the fixed sheave 22b. The transmission belt 23 is made of metal, and extends around the two pulleys 21 and 22 in a state fitted in the respective belt grooves thereof.

The variable pulley width mechanism 24 changes the belt groove widths of the two pulleys 21 and 22, to thereby change the effective diameters thereof. The variable pulley width mechanism 24 includes a drive-side oil chamber 24a and a driven-side oil chamber 24b which are respectively formed within the movable sheaves 21a and 22a, and a drive pulley electromagnetic valve 24c and a driven pulley electromagnetic valve 24d which control respective oil pressures supplied from an oil pressure pump, not shown, to the oil chambers 24a and 24b. The electromagnetic valves 24c and 24d have its valve opening controlled by an ECU 2 (see FIG. 2).

With the arrangement described above, in the stepless transmission 20, the oil pressures supplied to the two oil chambers 24a and 24b are controlled by controlling the valve opening degrees of the two electromagnetic valves 24c and 24d by the ECU 2, whereby the two movable sheaves 21a and 22a are axially driven, respectively. This steplessly changes the respective effective diameters of the two pulleys 21 and 22, to thereby steplessly or continuously change transmission gear ratio of the stepless transmission 20.

The auxiliary shaft 11 is rotatably supported on a pair of bearings, not shown, and extends parallel with the mains haft 6. The auxiliary shaft 11 has a gear 11a integrally formed thereon which is in mesh with a second gear 9b of the aforementioned first idler shaft 9. Further, a fourth clutch CL4 is provided between the driven pulley 22 of the auxiliary shaft 11 and the gear 11a. The fourth clutch CL4 is of a friction multi-disc clutch similar to the first clutch CL1, and the degree of engagement thereof is controlled by the ECU 2, whereby the connection between the driven pulley 22 and the gear 11a is established and cut off.

With the arrangement described above, when the third and fourth clutches CL3 and CL4 are engaged, the aforementioned sun gear S is connected to the drive wheels DW and DW via the main shaft 6, the stepless transmission 20, the auxiliary shaft 11, the gear 11a, the second gear 9b, the first idler shaft 9, the second idler shaft 10, the gear 10a, the gear 12a, the differential gear mechanism 12, and the drive shafts 13 and 13. Hereinafter, a sequence of these component elements from the main shaft 6 to the drive shafts 13 and 13 is referred to as "the second power transmission path" as deemed appropriate.

Further, as shown in FIG. 2, a crank angle sensor 41 detects the crank angle position of the crankshaft 3a of the engine 21, and delivers a signal indicative of the sensed crank angle position to the ECU 2, described hereinafter. The ECU 2 calculates the rotational speed of the engine 3 (hereinafter referred to as "the engine speed") NE based on the crank angle position, Further, a drive pulley rotational speed sensor 42 delivers a detection signal indicative of a drive pulley rotational speed NDR as the rotational speed of the drive pulley 21 to the ECU 2, and a driven pulley rotational speed sensor 43 delivers a detection signal indicative of a driven pulley rotational speed NDN as the rotational speed of the driven pulley 22 to the ECU 2. The ECU 2 calculates the transmission gear ratio RATIO (=NDR/NDN) of the stepless transmission 20 based on the drive pulley rotational speed NDR and the driven pulley rotational speed NDN.

Further, a rotational angle position sensor 44 delivers detection signals indicative of rotational angle positions of the rotor 32 of the rotary motor 30 to the ECU 2. The ECU 2 calculates the rotational speed of the rotary motor 30 (hereinafter referred to as "rotary motor rotational speed") NM based on the detection signal. Further, a current-voltage sensor 45 delivers a detection signal indicative of current-voltage values input to and output from the battery 36 to the ECU 2. The ECU 2 calculates the remaining charge SOC of the battery 36 based on the detection signal.

Further, an accelerator pedal opening sensor 46 deliver a detection signal indicative of an accelerator pedal opening AP as a stepped-on amount of an accelerator pedal, not shown, of the vehicle to the ECU 2, and a vehicle speed sensor 47 delivers a detection signal indicative of a vehicle speed VP to the ECU 2.

The ECU 2 is implemented by a microcomputer comprised of a CPU, a RAM, a ROM, and an I/O interface, and controls the operation of the engine 3, the rotary motor 30, and the stepless transmission 20, based on the detection signals from the aforementioned sensors 41 to 47.

Next, a description will be given of the operation of the power plant 1 when the vehicle is at a stop and is traveling. First, a description will be given of an operation of the rotary motor 1 when the engine 3 is started when the vehicle is at a stop (hereinafter referred to as "at the time of ENG start during a vehicle stop"). At the time of ENG start during a vehicle stop, the rotary motor 30 is used as a starter. More specifically, the first and second clutches CL1 and CL2 are engaged to thereby connect the sun gear S and the carrier C to the crank shaft 3a. Further, the electromagnetic brake BR is controlled to be off, thereby permitting the rotation of the carrier C.

Further, the third clutch CL3 is disengaged to thereby disconnect the rotor 32 of the rotary motor 30 connected to the first idler shaft 9 as described above from the drive wheels DW and DW, and the fourth clutch CL4 is disengaged to disconnect the ring gear R connected to first idler shaft 9 from the driven pulley 22. Further, the rotor 32 is caused to rotate in the direction of rotation of the crank shaft 3a. It should be noted that the direction of rotation of the crankshaft 3a is the same as the normal rotation of the drive wheels DW and DW. Hereinafter, as to all the rotary elements and the drive wheels DW and DW in the power plant 1, the same direction of rotation as that of the crankshaft 3a is referred to as "normal rotation" and the direction of rotation in the opposite direction is referred to as "reverse rotation".

Figure 3:
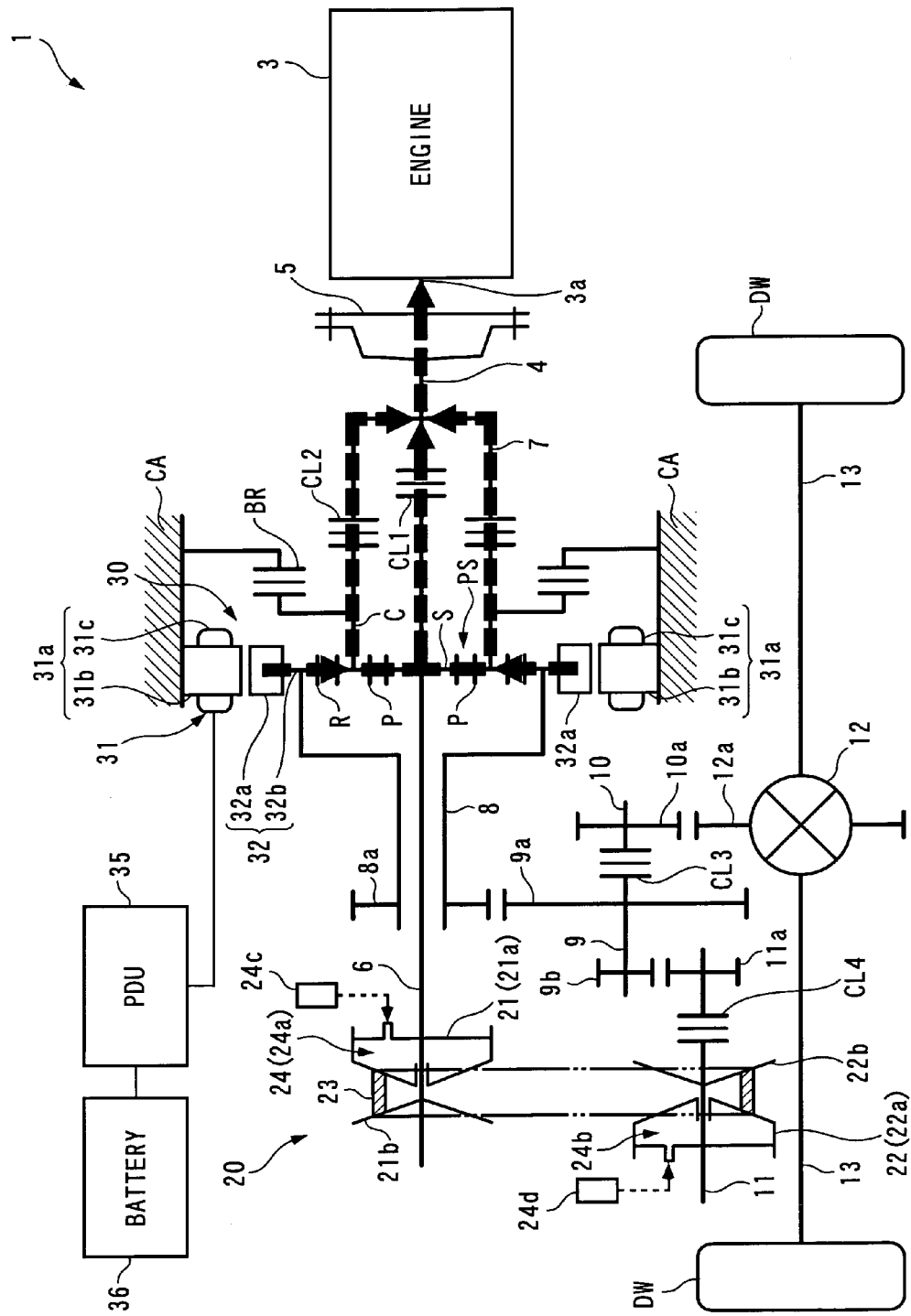
FIG. 3 is a diagram illustrating how torque is transmitted in the power plant at ENG start up during a vehicle stop.

From the above, at the time of ENG start up during a vehicle stop, the torque of the rotary motor 30 (hereinafter referred to as the "rotary motor torque") is, as shown in FIG. 3, transmitted via the ring gear R and the planetary gear P to both the carrier C and the sun gear S, and then is transmitted via the first connecting shaft 4 to the crankshaft 3a. As a consequence, the ring gear R, the carrier C, the sun gear S, and the crankshaft 3a perform normal rotation in unison with each other. In this state, fuel injection valves, not shown, of the engine 3 and respective ignition operations of spark plugs, not shown, are controlled according to the crank angle position, to thereby start the engine 3. In this case, the output from the rotary motor 30 is controlled such that the engine speed NE becomes equal to a predetermined rotational speed suitable for starting the engine 3. It should be noted that in FIG. 3 and other figures, referred to hereinafter, showing how torque is transmitted, thick broken lines with respective arrows indicate a flow of torque.

As is apparent from the above-described arrangement, the drive pulley 21 and the driven pulley 22 are connected to the sun gear 3 and the ring gear R, respectively. On the other hand, at the time of ENG start up during a vehicle stop, the disengagement of the fourth clutch CL4 disconnects the ring gear R that rotates in unison with the crankshaft 3a from the driven pulley 22, the transmission gear ratio RATIO of the stepless transmission 20 can be held at a desired low-speed value suitable for standing start of the vehicle.

Next, a description will be given of an operation of the power plant 1 when the vehicle is caused to travel using the rotary motor 30 alone as a power source (hereinafter referred to as "EV traveling"). During EV traveling, the first and second clutches CL1 and CL2 are disengaged to disconnect the sun gear S and the carrier C from the crankshaft 3a, and the electromagnetic brake BR is controlled to be off, thereby permitting the rotation of the carrier C. Further, the third clutch CL3 is engaged to thereby connect the rotor 32 together with the ring gear R to the drive wheels DW and DW via the aforementioned first power transmission path. Further, the fourth clutch CL4 is disengaged to thereby disconnect the driven pulley 22 from the ring gear R, and the rotor 32 is caused to perform normal rotation.

Figure 4:
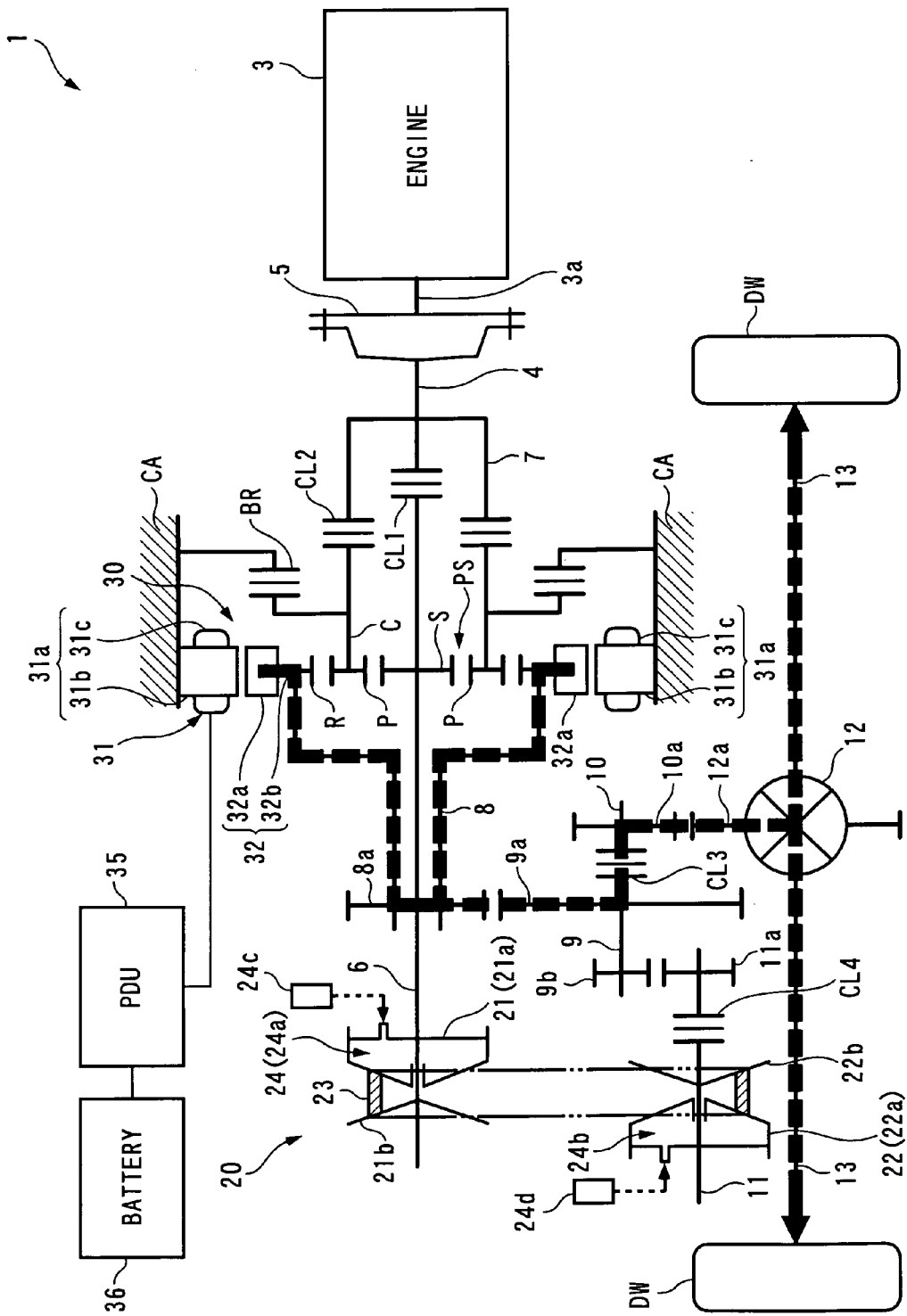
FIG. 4 is a diagram illustrating how torque is transmitted in the power plant, during EV traveling.

From the above, during EV traveling, the rotary motor toque is, as shown in FIG. 4, transmitted to the drive wheels DW and DW via the first power transmission path not including the stepless transmission 20. As a consequence, the drive wheels DW and DW perform normal rotation to cause the vehicle to travel forward. Further, as described above, by disengaging the first and second clutches CL1 and CL2, it is possible to prevent the power of the rotary motor 30 from being transmitted to the engine 3. Therefore, the drive efficiency of the drive wheels DW and DW can be increased accordingly.

Figure 5:
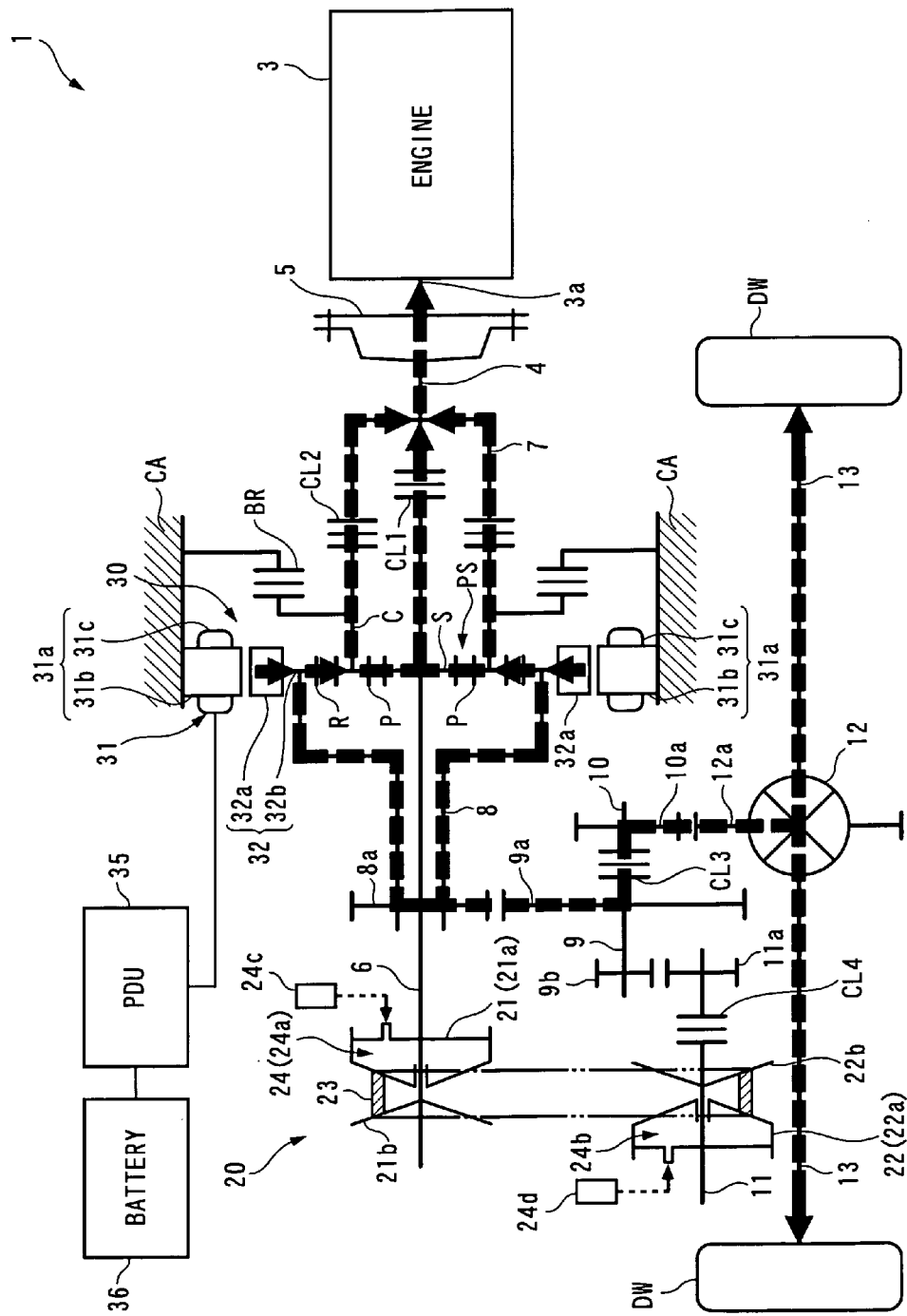
FIG. 5 is a diagram illustrating how torque is transmitted in the power plant, at ENG start up during EV traveling.

Further, during EV traveling, the start up of the engine 3 is performed in the following manner (hereinafter, the start up of the engine 3 in this state is referred to as "engine start up during EV traveling"). That is, from the above-mentioned engagement states of the clutches (CL1, CL2, and CL4: disengaged; CL3: engaged; BR: OFF), the first and second clutches CL1 and CL2 are engaged, whereby the sun gear S and the carrier C are connected to the crankshaft 3a. Thus, the rotary motor torque is transmitted, as shown in FIG. 5, not only to the drive wheels DW and DW, but also to the crankshaft 3a via the ring gear R, the planetary gear P, the carrier C, and the sun gear S. As a consequence, the crankshaft 3a performs normal rotation. In this state, according to the crank angle position, the fuel injection valves of the engine 3 and the respective ignition operations of the spark plugs are controlled, to thereby start the engine 3.

Further, at the time of ENG start up during EV traveling, the output from the rotary motor 30 is controlled to such a magnitude that is capable of generating demanded torque PMCMD to thereby make it possible to maintain the vehicle speed VP at the time, and is capable of causing rotation of the crankshaft 3a. The demanded torque PMCMD is torque demanded by the vehicle, and is calculated by searching a map (not shown) according to the vehicle speed VP and the accelerator pedal opening AP.

Next, a description will be given of an operation of the power plant 1 when the vehicle is caused to travel using the engine 3 alone as a power source (hereinafter referred to as "ENG traveling"). During ENG traveling, the first clutch CL1 is disengaged to disconnect the sun gear S from the crankshaft 3a, and the second clutch CL2 is engaged to connect the carrier C to the crankshaft 3a. Further, the electromagnetic brake BR is controlled to be off to permit rotation of the carrier C. Further, the third and fourth clutches CL3 and CL4 are engaged to thereby connect the ring gear R and the driven pulley 22 to the drive wheels DW and DW.

Figure 6:
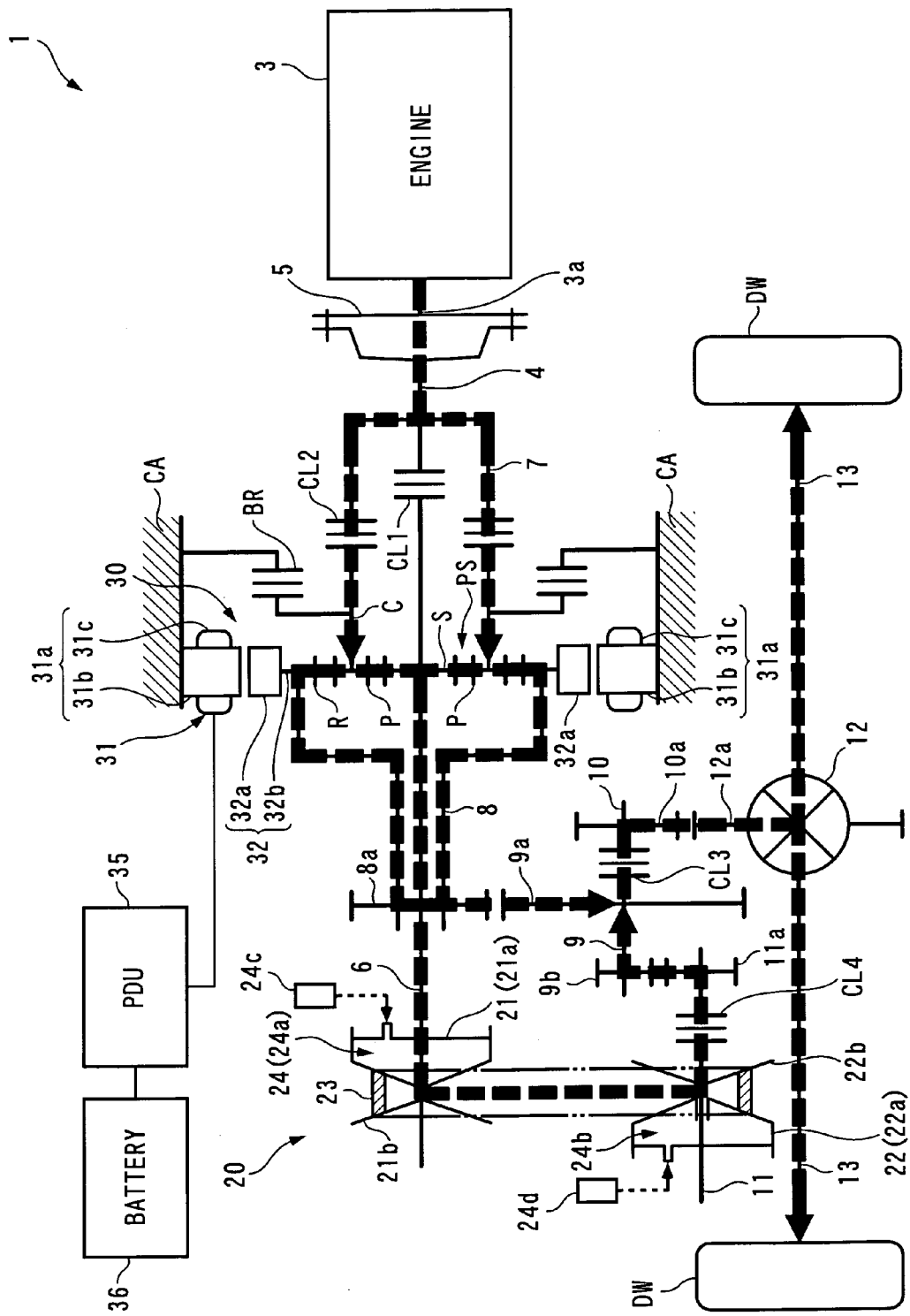
FIG. 6 is a diagram illustrating how torque is transmitted in the power plant, during ENG traveling.

Thus, as shown in FIG. 6, during ENG traveling, the torque of the engine 3 (hereinafter referred to as "engine torque") is transmitted to the carrier C, and then be distributed to the sun gear S and the ring gear R. Torque distributed to the sun gear S is transmitted via the main shaft 6 and the stepless transmission 20 to the first idler shaft 9, and on the other hand, torque distributed to the ring gear R is transmitted via the rotary shaft 8 to the first idler shaft 9. Then, the two kinds of torque are combined by the first idler shaft 9, and the resulting torque is transmitted to the drive wheels DW and DW. Thus, the engine torque is transmitted to the drive wheels DW and DW via the first power transmission path not including the stepless motor 20 and via the aforementioned second power transmission path including the stepless transmission 20. As a consequence, the drive wheels DW and DW perform normal rotation to cause the vehicle to travel forward. Further, the power transmitted to the drive wheels DW and DW is equal to the power of the engine 3, provided that the transmission losses thereof at the gears are ignored.

Further, during ENG traveling, the power of the engine 3 is controlled to provide the demanded power output determined by the engine speed VP and the demanded torque PMCMD. Further, by controlling the transmission gear ratio RATIO of the stepless transmission 20, the power of the engine 3 is subjected to a change of the rotational speed. Hereafter, a description will be given of the change of the rotational speed.

Figure 7A:
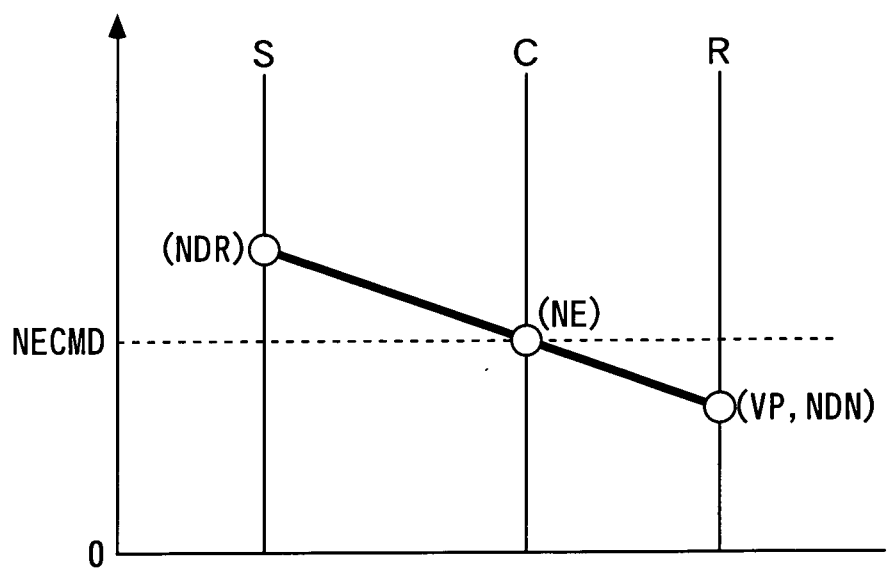
FIGS. 7A and 7B are views useful in explaining how speed is changed by a stepless transmission.
Figure 7B:
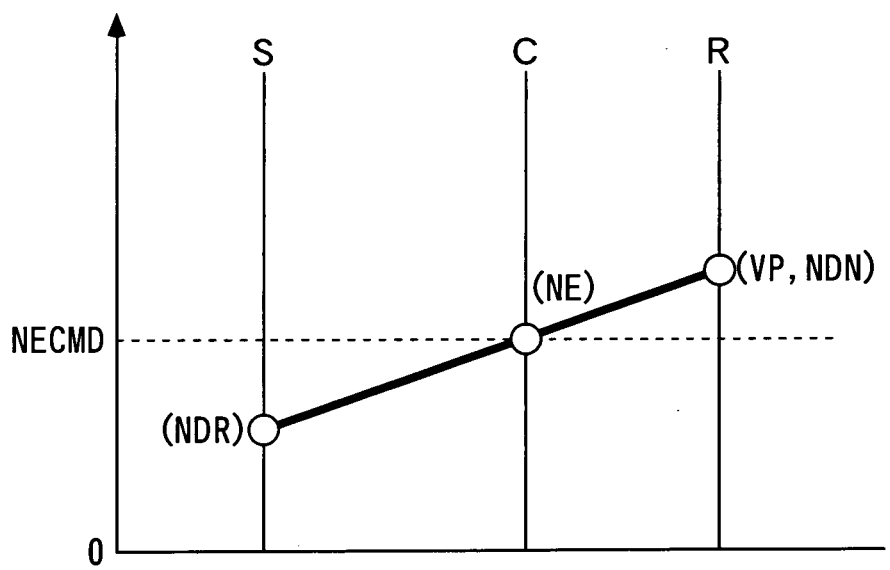

As described hereinbefore, the sun gear S and the drive pulley 21 are connected to each other, and hence the rotational speed of the sun gear S and the rotational speed NDR of the drive pulley are equal to each other. Further, during ENG traveling, the carrier C is connected to the crankshaft 3a (CL2: engaged), and hence the rotational speed of the carrier C and the rotational speed NE of the engine are equal to each other. Further, the ring gear R and the driven pulley 22 are connected to the drive wheels DW and DW via a plurality of gears (CL3, CL4: engaged), and hence, if the change of the rotational speed by these gears is ignored, the rotational speed of the ring gear R and the rotational speed NDN of the driven pulley are equal to the vehicle speed VP. Therefore, an alignment chart representing the relationships between these rotational speeds is as shown in FIGS. 7A and 7B. In the alignment chart, the vertical axis represents the rotational speed, and the respective rotational speeds of the sun gear S, the carrier C, and the ring gear R are shown side by side along the horizontal axis, and the intervals of the rotational speeds along the horizontal axis are defined based on the number of gear teeth of the sun gear S and that of gear teeth of the ring gear R. In this alignment chart, the respective rotational speeds of the sun gear S, the carrier C, and the ring gear R are aligned in a line, which represents a collinear relationship.

As is apparent from FIG. 7A, by controlling the transmission gear ratio RATIO (NDR/NDN) such that the rotational speed is reduced (NDR/NDN>1), the power of the engine 3 is transmitted to the drive wheels DW and DW with reduced rotational speed. Inversely, as is apparent from FIG. 7B, by controlling the transmission gear ratio RATIO such that the rotational speed is increased (NDR/NDN<1), the power of the engine 3 is transmitted to the drive wheels DW and DW with increased rotational speed.

Further, during ENG traveling, the transmission gear ratio RATIO is controlled according to the gear ratio between the sun gear S and the ring gear R and the vehicle speed VP, such that the engine speed NE become equal to a predetermined target engine speed NECMD. The target engine speed NECMD is calculated by searching a map (not shown) according to the vehicle speed VP and the demanded torque PMCMD. In this map, the target engine speed NECMD is set to such a value that the best fuel economy of the engine 3 is obtained with respect to the vehicle speed VP and the demanded torque PMCMD at the time. This makes it possible to obtain the best economy of the engine during ENG traveling.

Further, during the above-mentioned ENG traveling, when the remaining charge SOC of the battery 36 is larger than a predetermined value SOCREF, i.e. relatively large, the vehicle is caused to travel by assisting the engine 3 by the rotary motor 30 (hereinafter referred to as "assist traveling"). The predetermined value SOCREF is set to a value with hysteresis.

Figure 8:
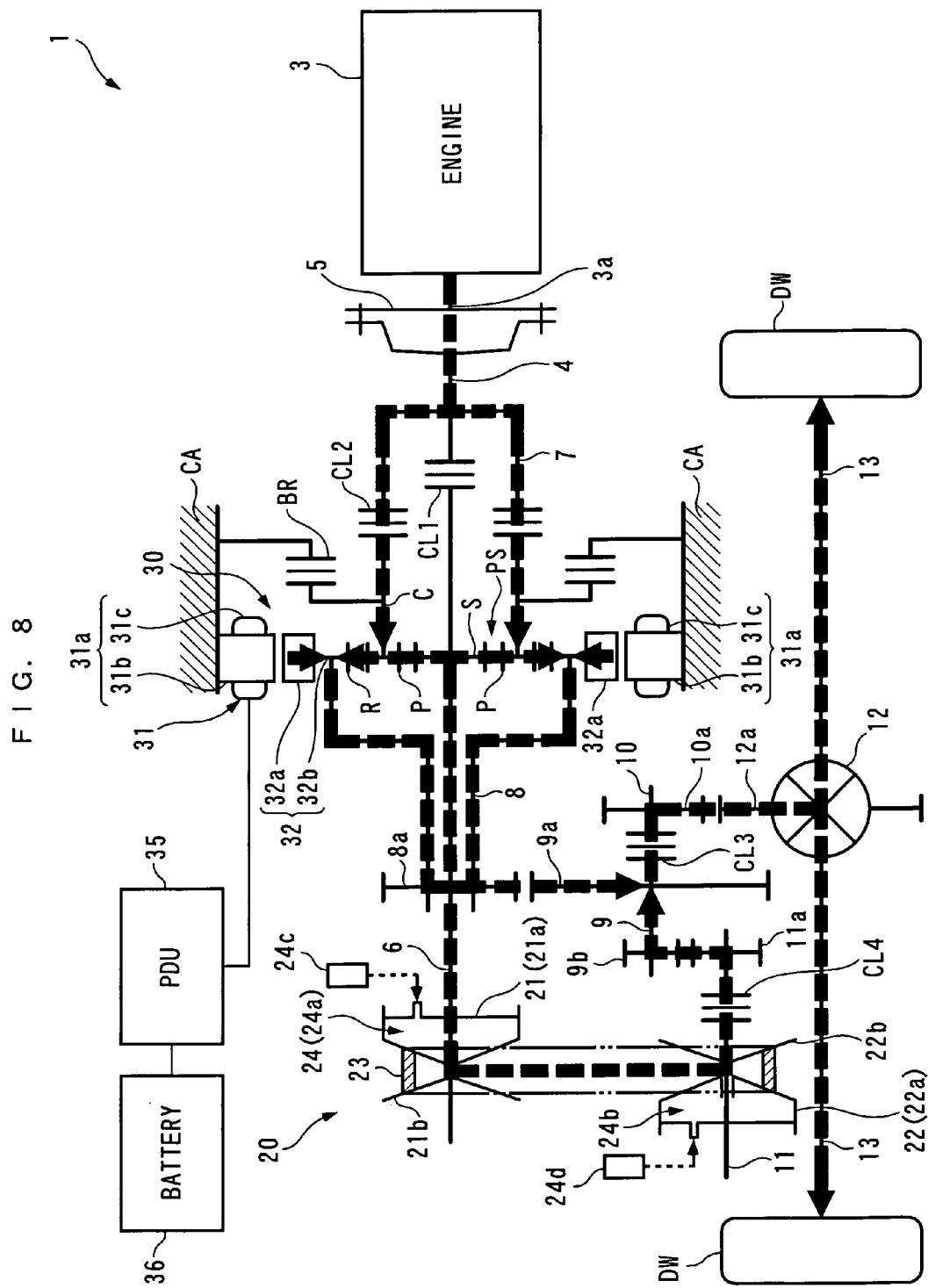
FIG. 8 is a diagram illustrating how torque is transmitted in the power plant during assist traveling.

During assist traveling, as shown in FIG. 8, the combined torque obtained by combining the distributed engine torque, as described above, and the rotary motor torque is transmitted to the ring gear R. The combined torque is combined at the first idler shaft 9 with the engine torque distributed to the sun gear S as described above, and then the resulting torque is transmitted to the drive wheels DW and DW. From the above, during assist traveling, the power transmitted to the drive wheels DW and DW is equal to the sum of the power of the engine 3 and the power of the rotary motor 30, provided that the transmission losses at the gears and the like are ignored.

During assist traveling, the rotary motor torque is controlled according to the vehicle speed VP such that the best efficiency of the rotary motor 30 is obtained. Further, the power of the engine 3 is controlled such that it becomes equal to demanded power output determined by torque obtained by subtracting the rotary motor torque from the demanded torque PMCMD (hereinafter referred to as "differential torque") and the vehicle speed VP. Further, the transmission gear ratio RATIO is controlled in the same manner as performed during ENG traveling. However, in this case, the target engine speed NECMD is calculated by searching a map (not shown) according to the vehicle speed VP and the aforementioned differential torque. In this map, the target engine speed NECMD is set to such a value that the best fuel economy of the engine 3 is obtained with respect to the vehicle speed VP and the differential torque at the time. Thus, it is possible to obtain the best economy of the engine 3 and the best efficiency of the rotary motor 30 during assist traveling.

Figure 9:
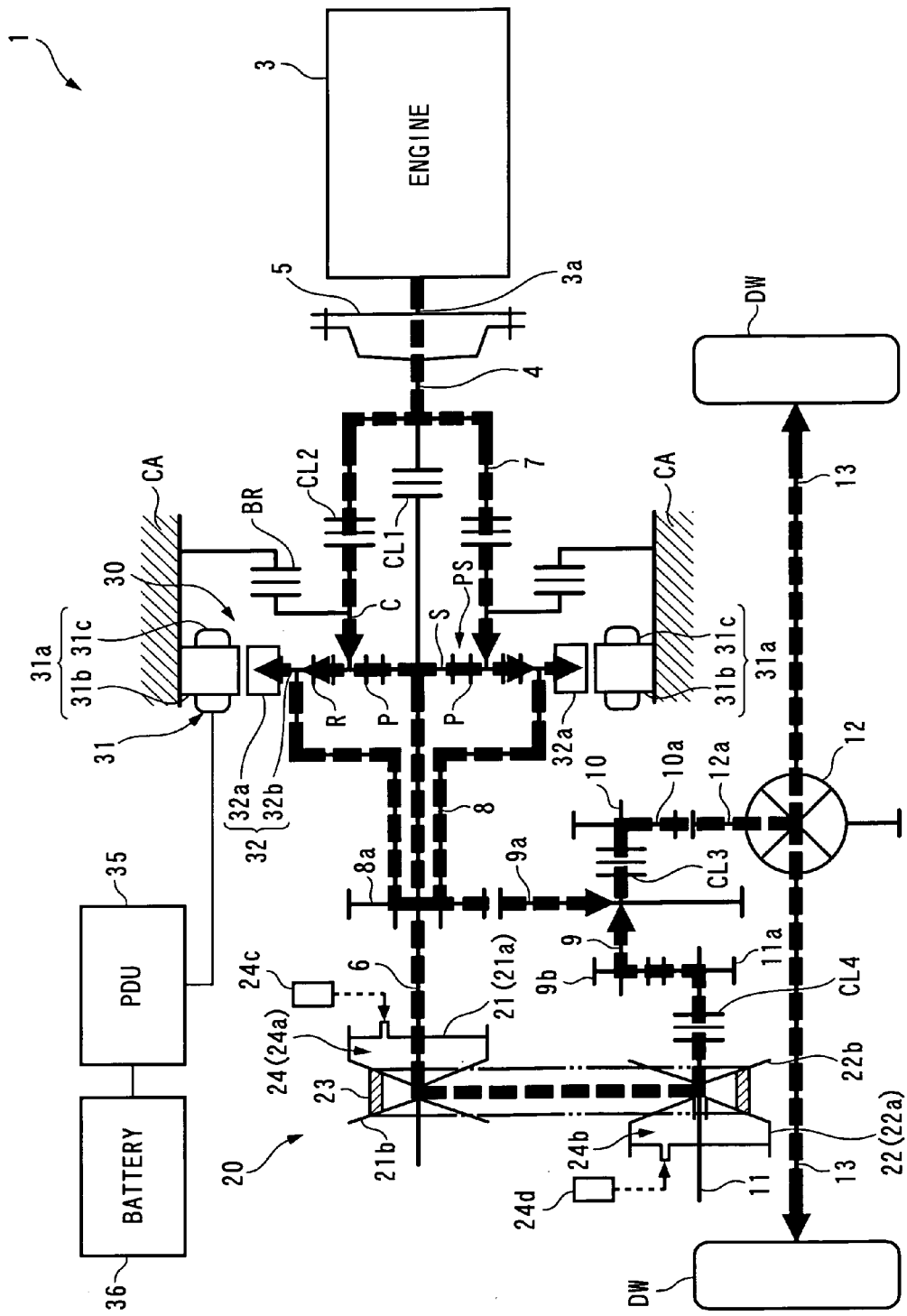
FIG. 9 is a diagram illustrating how torque is transmitted in the power plant during drive-time charging.

On the other hand, during ENG traveling, when the remaining charge SOC is smaller than the predetermined value SOCREF, i.e. relatively small, electric power is generated by the rotary motor 30 using the power of the engine 3, and the battery 36 is charged with the generated electric power (hereinafter referred to as "drive-time charging". During drive-time charging, as shown in FIG. 9, part of the engine torque distributed to the ring gear R is transmitted to the rotary motor 30 and at the same time, the remaining part of the engine torque distributed to the ring gear R is combined at the first idler shaft 9 with the engine torque distributed to the sun gear S, as described above, and the resulting torque is transmitted to the drive wheels DW and DW. Thus, during drive-time charging, the power transmitted to the drive wheels DW and DW becomes equal to a magnitude obtained by subtracting the electric power (energy) generated by the rotary motor 30 from the power of the engine 3, provided that the transmission losses at the gears and the like are ignored.

Further, during drive-time charging, the electric power generated by the rotary motor 30 is controlled according to the vehicle speed VP to such a magnitude that the best electric power generation efficiency is obtained. Further, the power of the engine 3 is controlled in the following manner: Assuming that electric power generation torque is defined as torque equivalent to the rotary motor rotational speed NM and the electric power generated by the rotary motor 30, the power of the engine 3 is controlled to be a demanded power output determined by torque obtained by adding the electric power generation torque to the demanded torque PMCMD (hereinafter referred to as "addition torque") and the vehicle speed VP. Further, the transmission gear ratio RATIO is controlled in the same manner as controlled during the above-described ENG traveling. However, in this case, the target engine speed NECMD is calculated by searching a map (not shown) according to the vehicle speed VP and the addition torque. In this map, the target engine speed NECMD is set to such a value that will make it possible to obtain the best fuel economy of the engine 3 with respect to the vehicle speed VP and the addition torque at the time. From the above, during drive-time charging, it is possible to obtain the best fuel economy of the engine 3 and the best electric power generation efficiency of the rotary motor 3.

Next, a description will be given of an operation of the power plant 1 when the vehicle is traveling rearward using the power of the engine 3. During rearward traveling of the vehicle, the first clutch CL1 is engaged to connect the sun gear S to the crankshaft 3a, and the second clutch CL2 is disengaged to disconnect the carrier C from the crankshaft 3a. Further the electromagnetic brake BR is controlled to be on to hold the carrier C unrotatable. Further, the third clutch CL3 is engaged to connect the ring gear R to the drive wheels DW and DW, and the fourth clutch CL4 is disengaged to disconnect the driven pulley 22 from the ring gear R.

Figure 10:
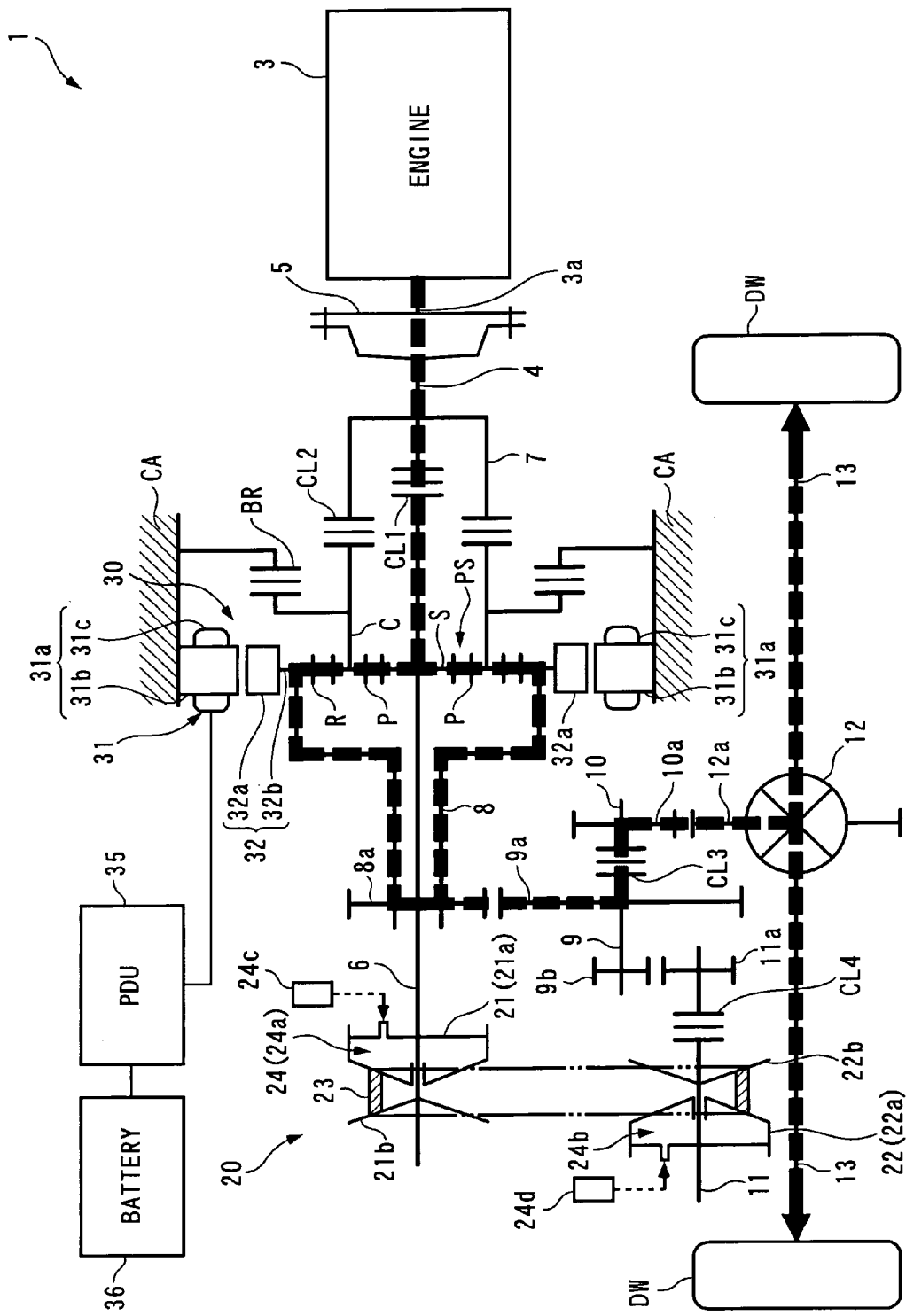
FIG. 10 is a diagram illustrating how torque is transmitted in the power plant during rearward traveling of the vehicle.

Thus, during rearward traveling of the vehicle, as shown in FIG. 10, the engine torque is transmitted to the sun gear S, and then to the ring gear R via the planetary gear P using the carrier C as a support. Further, the engine torque is transmitted to drive wheels DW and DW via the first power transmission path. As a consequence, the ring gear R and the drive wheels DW and DW perform reverse rotation to cause the vehicle to travel rearward.

Next, a description will be given of an operation of the power plant 1 when the vehicle is performing decelerating travel. During decelerating travel of the vehicle, the first and second clutches CL1 and CL2 are disengaged to thereby disconnect the sun gear S and the carrier C from the crankshaft 3a, and the electromagnetic brake BR is controlled to be off to thereby permit rotation of the carrier C. Further, the third clutch CL3 is engaged to connect the ring gear R to the drive wheels DW and DW, and the fourth clutch CL4 is disengaged to disconnect the driven pulley 22 from the ring gear R. Further, using the drive wheels DW and DW, the electric power generation is performed using the rotary motor 30, and the battery 36 is charged with the generated electric power.

Figure 11:
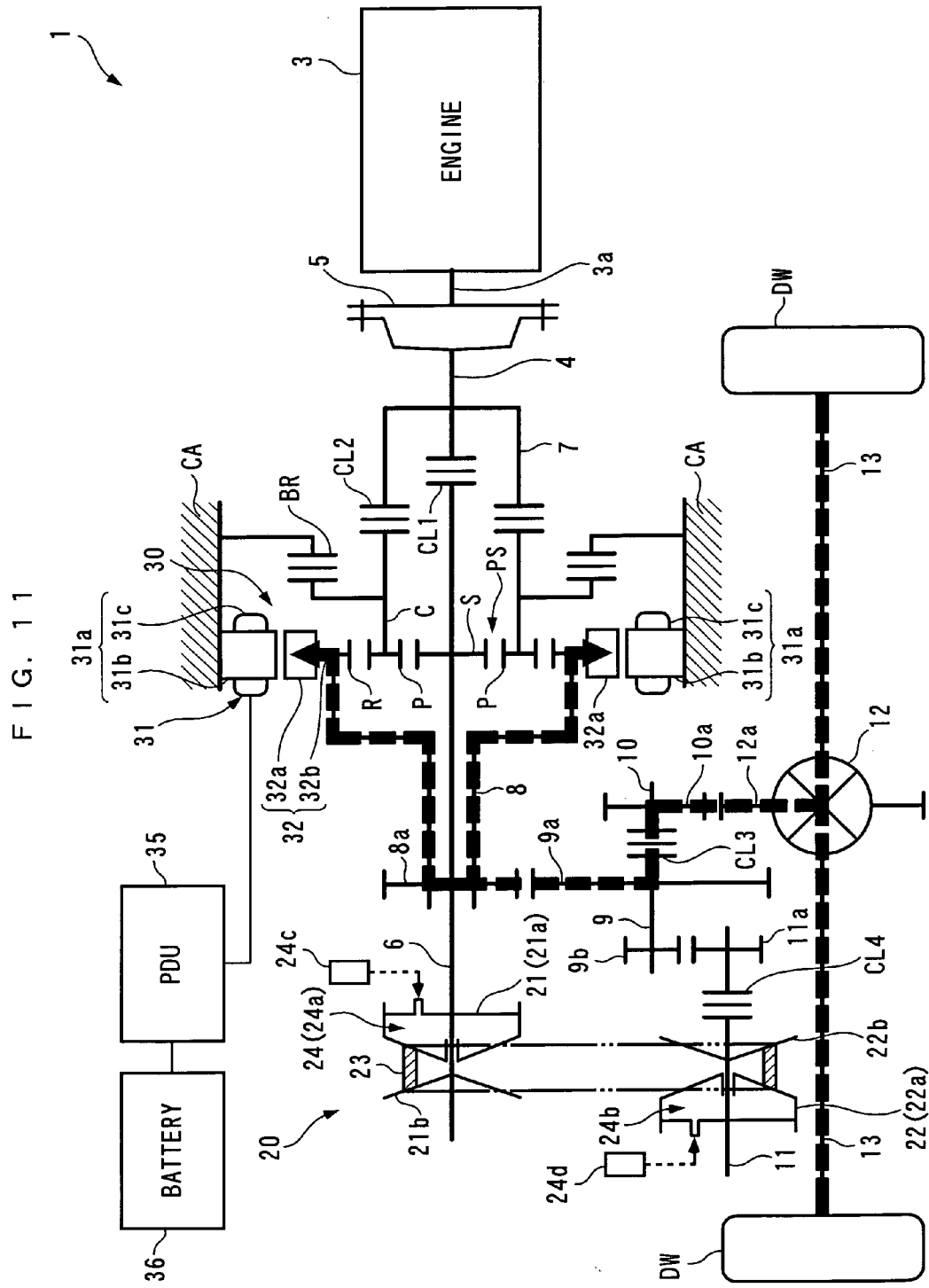
FIG. 11 is a diagram illustrating how torque is transmitted in the power plant during decelerating traveling of the vehicle.

Thus, during decelerating travel of the vehicle, as shown in FIG. 11, the torque of the drive wheels DW and DW is transmitted to the rotary motor 30 via the first power transmission path without via the stepless motor 20. Further, in this case, the power of the drive wheels DW and DW is transmitted to the stepless motor 20 via the planetary gear P and the sun gear S, so that both the pulleys 21 and 22 perform idle running, so that the transmission gear ratio RATIO can be controlled to a desired value while suppressing damage to contact surfaces of the pulleys 21 and 22 and the transmission belt 23. Further, by disengaging the first and second clutches CL1 and CL2, it is possible to prevent the power of the drive wheels DW and DW from being transmitted to the engine 3, and hence the battery can be charged by the larger electric power.

According to the present embodiment, as described hereinabove with reference to FIGS. 4 and 11, the transmission of power between the rotary motor 30 and the drive wheels DW and DW is executed via the first power transmission path not including the stepless transmission 20, and hence it is possible to enhance the efficiency of driving the drive wheels DW and DW by the rotary motor 30 and the efficiency of electric power generation by the rotary motor 30 using the drive wheels DW and DW. Further, as described with reference to FIG. 6, the transmission of power of the engine 3 to the drive wheels DW and DW is performed not only via the second power transmission path including the stepless transmission 20 but also via the first power transmission path not including the stepless transmission 20, it is also possible to increase the efficiency of driving the drive wheels DW and DW by the engine 3. Furthermore, for the same reason, it is possible to reduce torque transmitted to the stepless transmission 20, and hence by employing a stepless motor suited to the magnitude of reduced transmission torque, it is possible to increase the efficiency of the stepless transmission 20 and reduce the size of the same, which in turn makes it possible to further increase the drive efficiency of the power plant 1 as a whole and reduce the size of the same.

Further, since the sun gear S and the ring gear R are connected to the front drive wheels DW and DW of the four-wheel vehicle, it is possible to further increase the drive efficiency of the drive wheels DW and DW during both of the assist traveling and the drive-time charging, and easily control the torque of the drive wheels DW and DW to a desired magnitude.

The present invention is not limited to the embodiment described above, but it can be practiced in various forms. For example, although in the above-described embodiment, the rotary motor 30 is connected to the ring gear R and the stepless transmission 20 is connected between the sun gear S and the drive wheels DW and DW, the connecting relationship between them may be inverted, i.e. it may be configured that the rotary motor 30 is connected to the sun gear S and the stepless transmission 20 is connected between the ring gear R and the drive wheels DW and DW. Further, although in the present embodiment, the sun gear S and the ring gear R are connected to the front drive wheels DW and DW of the front-driven four-wheel vehicle, by way of example, in the case of a rear-driven vehicle, they may be connected to rear drive wheels. Further, in the case of AWD (All Wheel Drive) vehicles, they may be connected to the front and rear drive wheels. Further, in the above-described embodiment, the rotor 32 of the rotary motor 30 is integrally formed with the ring gear R, the present invention encompasses a case where the rotor 32 is connected to the ring gear R via a gear or the like.

Further, in the embodiment, a gasoline engine is used as the prime mover, a diesel engine or an external combustion engine may be used. Further, in the present embodiment, a DC brushless motor is used as the rotary motor 30, any other suitable motor may be used insofar as it generates power by supply of electric power thereto and generates electric power by input of power thereto. An AC motor may be used, for example. Further, although in the present embodiment, the stepless transmission 20 is used as the transmission, a stepped transmission may be used. Moreover, although in the above-described embodiment, the present invention is applied to a vehicle, by way of example, this is not limitative, but the present invention may be applied to boats, aircraft, and the like. Further, although in the present embodiment, controllers for controlling the engine 3, the rotary motor 30, and the stepless transmission 20 are implemented by the ECU 2 and the PDU 35, the controllers may be implemented by electric circuits incorporating microcomputers.

It is further understood by those skilled in the art that the foregoing are preferred embodiments of the invention, and that various changes and modifications may be made without departing from the spirit and scope thereof.

What is claimed is:

1. A power plant for driving a driven part, comprising:
   a prime mover having an output shaft;
   a planetary gear train including a sun gear, a ring gear, and a carrier rotatably supporting a planetary gear in mesh with said sun gear and said ring gear, said sun gear and said ring gear being connected to said driven part in parallel with each other, said carrier being connected to said output shaft of said prime mover;
   a rotary motor having an output connected to one of said sun gear and said ring gear; and
   a transmission connected between the other of said sun gear and said ring gear, and said driven part, for varying a speed of power of said prime mover and transmitting the power to said driven part, wherein said output shaft of said prime mover is connected to said driven part via a first power transmission path and a second power transmission path, wherein said first power transmission path includes said carrier and the one of said sun gear and said ring gear, and does not include the other of said sun gear and said ring gear and said transmission, and wherein said second power transmission path includes said carrier, the other of said sun gear and said ring gear, and said transmission, and does not include the one of said sun gear and said ring gear.

2. A power plant as claimed in claim 1, wherein said driven part comprises drive wheels formed by one of a front set of wheels or a rear set of wheels, and wherein the one and the other of said sun gear and said ring gear are both connected to said drive wheels.

* * * * *